Patented Feb. 11, 1947

2,415,754

UNITED STATES PATENT OFFICE 2,415,754

MERCURIATED-(α,α,γ,γ,-TETRAMETHYL) BUTYL-PHENOLS

Joseph B. Niederl, Brooklyn, N. Y.

No Drawing. Application December 16, 1943, Serial No. 514,547

5 Claims. (Cl. 260—434)

This invention relates to germicides, antiseptics and disinfectants, and more particularly, to organic compounds containing mercury of the class generally referred to as mercuriated phenols.

The mercuriated phenols and, in general, organic compounds containing mercury owe their value, in part at least, to the fact that they offer the possibility of being employed at high dilutions and thus minimize the amount of mercury coming in contact with the human or animal organism. They thus differ in general from the inorganic mercury compounds which have to be used at rather high concentrations and thus are attended with the danger of absorption of mercury through the skin. However, these organic mercurials, unless used at concentrations higher than desirable, have as their outstanding quality the prevention of the growth and multiplication of bacteria or other microorganisms rather than a bactericidal value.

It is an object of this invention to provide a mono- or poly-mercuriated phenol which at high dilutions possesses not only the ability to prevent the growth and multiplication of bacteria and other microorganisms but also bactericidal power.

It is also among the objects of the present invention to provide compositions containing therein the new mercuriated phenols, which may be adapted for various uses, such as for topical remedies, seed disinfectants and others.

In accordance with the generic features of the invention, a mercuriated phenol is produced having an aliphatic side chain consisting of at least eight carbon atoms. Subgenerically, the side chain is branched and is preferably a tertiary alkyl radical. The preferred species of side chain is the di-isobutyl (alpha, alpha, gamma, gamma tetramethyl-butyl) radical and in its more specific aspects the invention relates to mercuriated derivatives of the "diisobutyl mono-, di- and trihydroxyphenols" which phenols are described by the inventor in the Journal of the American Chemical Society, vol. 55, pp. 2571 (1933). The aromatic phenolic group may, however, be mononuclear or polynuclear having at least one free phenolic hydroxy group. In the nucleus at least one mercury atom is substituted and connected to monovalent acid radical, organic or inorganic. Examples of such compounds are shown by the following table where X is a side chain as above defined, OH is a phenolic hydroxy group, "Hg" is a mercury atom, "R" is any monovalent acid radical, organic or inorganic, and "Y" is a short chain alkyl or alkoxyl radical.

1. 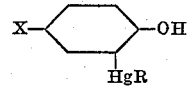

2. 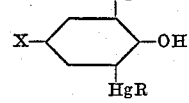

3. 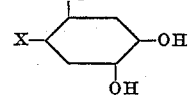

4. 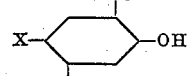

5. 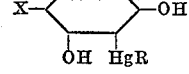

6. 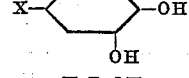

7. 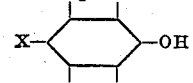

8. 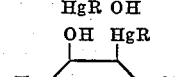

9. 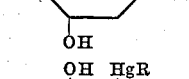

10. 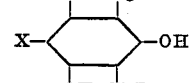

11. 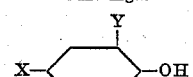

It will be noted that the common property running through all these compounds is an aromatic nucleus containing at least one phenolic OH group and an aliphatic side chain having at least eight carbon atoms. The specific differences in the compounds are the number of hydroxy and mercury substituents and the space relation thereof.

An illustrative method of preparation is to start with the appropriate tertiary octylphenol as described in the Journal of the American Chemical Society, supra, in Engineering Chemistry, vol. 30, pp. 1269 (1938), and in United States Patent No. 2,008,032 (1935), and then react with a suitable mercuric salt, preferably an organic mercuric salt. Any organic mercuric salt can be used, that is, a salt in which bivalent mercury is combined with any organic radical. Generally, the acid radicals of the lower fatty acids are employed, notably mercuric acetate, although this is a matter of convenience rather than necessity.

For example, in producing compound number 1, the monohydric phenol containing the X group in the para position to the hydroxyl radical is used and reacted with a proportion of mercuric acetate sufficient to introduce one acetoxymercuri radical. To produce compound number 2, a similar procedure is followed, using a sufficient quantity of mercuric acetate to introduce two of the acetoxymercuri radicals, and also employing an elevated temperature. In producing compound number 3, the procedure is similar to that involved in producing compound number 1, except that the dihydric phenol containing the X substituent in a position para to one of the OH groups is used. In producing compound number 4 the procedure is similar to that employed in producing compound number 3, the only difference being that a dihydric phenol having the OH groups in the meta position and the X substituent in a position para to one of them is utilized. In producing compound number 5 the procedure is similar to that involved in producing compound number 4, the only difference being that there is employed a sufficient quantity of mercuric acetate to introduce two of the acetoxymercuri radicals. In producing compound number 6, start is made with a trihydric phenol having the X substituent in a position para to one of them and react this with a sufficient quantity of mercuric acetate to introduce one of the acetoxymercuri radicals. In producing compound number 7 a similar procedure is employed, employing a sufficient quantity of mercuric acetate to introduce two of the acetoxymercuri radicals. In producing compound number 8 the procedure is similar to that employed in producing compounds numbers 6 and 7 except that start is made with a trihydric phenol having the OH radicals in a symmetrical position. In producing compound number 9 the procedure is similar to that employed in producing compound number 8, a sufficient quantity of mercuric acetate being employed to produce two of the acetoxymercuri radicals. In producing a compound of types 10 or 11, the procedure is similar to that involved in producing compound number 1, except that an alkylated or alkoxylated tertiary octylphenol, such as 2 - methyl-4-($\alpha,\alpha,\gamma,\gamma$-tetramethyl) butylphenol-1,
3 - methyl-4-($\alpha,\alpha,\gamma,\gamma$-tetramethyl) butylphenol-1,
2-methoxy-4-($\alpha,\alpha,\gamma,\gamma$-tetramethyl (butylphenol-1,
or
3-methoxy-4-($\alpha,\alpha,\gamma,\gamma$-tetramethyl) butylphenol-1 and the like is used as the starting material.

In general, it may be said that the technique of introducing into phenolic compounds a mercury atom to which is attached an acidic substituent is a well known technique and, therefore, no claim is made to such technique per se. In view of this knowledge, it is unnecessary to provide detailed procedures for the production of all of the species covered by the present invention and it will be sufficient to describe the illustrative procedures. The present invention involves the application of this known technique to certain classes of phenols having the alpha, alpha, gamma, gamma tetramethylbutyl radical in the para position to one of the hydroxyl groups.

In the above formulae the symbol R represents any acid radical. In general, the inorganic R radicals may be introduced by using an organic mercuric salt and then treating the resulting mercuriated phenol with a suitable salt of the inorganic acid whose radical it is desired to substitute for the organic radical.

Purely by way of illustration, the following specific examples are given, it being understood that any of the species embraced within the present invention may be prepared, in the light of the present invention, with the aid of these illustrative examples.

*Example 1*

8.2 grams of 4-($\alpha,\alpha,\gamma,\gamma$-tetramethylbutyl) phenol was mixed with 6 grams of mercuric acetate in 100 cc. of 50% alcohol-water mixture containing 5 cc. of glacial acetic acid. The solution was allowed to stand at room temperature for about a week. The crystals which had separated were filtered off, water added to the mother liquor until a slight turbidity remained, the solution allowed to stand 24 hours, the crystals filtered off and the process repeated until there is no further crystallization. The crystalline materials are combined, and recrystallized from 95% alcohol. The product 2-acetoxymercuri-4-($\alpha,\alpha,\gamma,\gamma$-tetramethylbutyl)-phenol, is a white crystalline solid having a melting point of 157–159° C.

*Example 2*

6.0 grams of 4-($\alpha,\alpha,\gamma,\gamma$-tetramethylbutyl)-phenol was mixed with 18.4 grams of mercuric acetate in 100 cc. of 95% alcohol containing 5 cc. of glacial acetic acid. The mixture was boiled under reflux for one hour and then allowed to stand at room temperature for several hours or over night. The solution, which had then become solid, was redissolved by warming, filtered while hot and the filtrate chilled. The precipitate was filtered off and crystallized from 95% alcohol. The product 2,6-di(acetoxymercuri) - 4 -($\alpha,\alpha,\gamma,\gamma$ - tetramethylbutyl)-phenol is a white solid in the form of needle-like crystals having a melting point of 177–179° C.

*Example 3*

2.0 grams of 4-($\alpha,\alpha,\gamma,\gamma$-tetramethylbutyl)-resorcinol was mixed with 5.8 grams of mercuric acetate in 100 cc. 95% alcohol and 5 cc. glacial acetic acid, and the mixture refluxed for one hour. After standing for several hours or over night, the mixture, which had become orange in color, was filtered and water added until a precipitate settled out. The solid precipitate of crude 2,6-di(acetoxymercuri) - 4 - ($\alpha,\alpha,\gamma,\gamma$ - tetramethylbutyl)-resorcinol was filtered off and purified by dissolving in 95% alcohol slightly acidified with acetic acid, and reprecipitating with water. The melting point is 158° C.

Example 4

1.0 grams of 2-acetoxymercuri-4-(α,α,γ,γ-tetramethylbutyl)-phenol as prepared in Example 1 was dissolved in 25 cc. of ethyl alcohol and added to water containing 10 grams of sodium chloride, while the solution was stirred slowly. The solution was extracted three times with ether, and the ether solution evaporated to dryness. The white, crystalline 2-chloromercuri-4-(α,α,γ,γ-tetramethylbutyl)-phenol has a melting point of 161° C.

Compounds of the above described type may be mixed with diluents, carriers or bases. For instance, a mixture thereof in small proportion with a powdered inert material, may be used as a seed disinfectant. A mixture with an unguent or salve base, may be used as a skin remedy. Or suitable solutions in appropriate solvents may be utilized. The amount of mercury compound present is small, usually not over 1–3%.

The above examples are intended to illustrate and not to limit the invention, which is to be broadly construed in accordance with the claims appended hereto.

What is claimed is:

1. An organic mercury compound having the formula

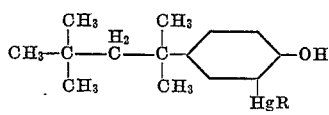

where R is an acid radical.

2. An organic mercury compound having the formula

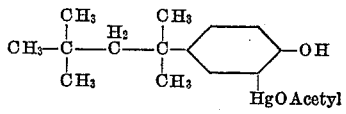

3. An organic mercury compound having the formula:

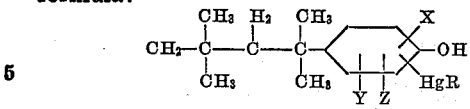

wherein X is selected from the class consisting of H, CH$_3$ and OCH$_3$, Y is selected from the class consisting of HgAcyl and H, Z is selected from the class consisting of H and OH, and R is an acid radical.

4. An organic mercury compound having the formula:

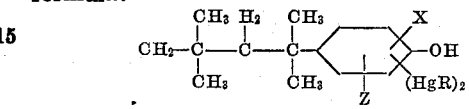

wherein X is selected from the class consisting of H, CH$_3$ and OCH$_3$, Z is selected from the class consisting of H and OH, and R is an acid radical.

5. An organic mercury compound having the formula:

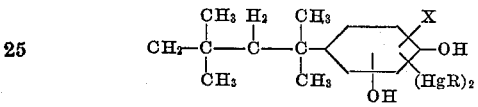

wherein X is selected from the class consisting of H, CH$_3$ and OCH$_3$ and R is an acid radical.

JOSEPH B. NIEDERL.

REFERENCES CITED

The following references are of record in the file of this patent:

UNITED STATES PATENTS

| Number | Name | Date |
|---|---|---|
| 2,037,371 | Franto | Apr. 14, 1936 |
| 2,163,745 | Christiansen | June 27, 1939 |
| 2,034,449 | Sharp | Mar. 17, 1936 |